United States Patent [19]

Dorsey

[11] 3,740,465

[45] June 19, 1973

[54] TELEVISION FRAME STORAGE APPARATUS

[75] Inventor: Denis Peter Dorsey, Levittown, Pa.

[73] Assignee: RCA Corporation, New York, N.Y.

[22] Filed: June 14, 1971

[21] Appl. No.: 152,746

[52] U.S. Cl. ................ 178/6.8, 178/6.6 FS, 315/12

[51] Int. Cl. ..... H01j 29/41, H04n 5/76, H04n 7/18

[58] Field of Search .................... 178/6.8, DIG. 23, 178/5.6; 315/11, 12

[56] References Cited

UNITED STATES PATENTS

| | | | |
|---|---|---|---|
| 3,061,670 | 10/1962 | Oster et al. | 178/6.8 |
| 3,631,294 | 12/1971 | Hofstein | 315/12 |
| 3,423,526 | 1/1969 | Law | 178/6.8 |
| 3,582,651 | 1/1971 | Siedband | 178/6.8 |
| 3,456,071 | 7/1969 | Jackson et al. | 178/5.6 |
| 3,401,299 | 10/1968 | Crowell | 315/12 |

*Primary Examiner*—Howard W. Britton
*Attorney*—Eugene M. Whitacre

[57] ABSTRACT

There is disclosed a television storage system which utilizes a storage device of the type having a target, which comprises a plurality of insulators arranged on a substrate; the insulators can be charged by a controlled electron beam to store a television image. Circuitry is shown which enables the coupling of such a storage device to a television receiver to permit operation of the system in a READ, WRITE and ERASE mode. This enables the consumer to store any desired television frame for later playback and further offers the advantage of changing the stored frame when desired.

4 Claims, 6 Drawing Figures

INVENTOR
Denis P. Dorsey
BY
ATTORNEY

INVENTOR.
Denis P. Dorsey
BY
ATTORNEY

INVENTOR.
Denis P. Dorsey
BY
ATTORNEY

INVENTOR.
Denis P. Dorsey
BY [signature]
ATTORNEY

INVENTOR.
Denis P. Dorsey
BY
ATTORNEY

TELEVISION FRAME STORAGE APPARATUS

This invention relates to television systems and, more particularly, to a system useful in storing television information.

It is anticipated that there will be a transition to more complex consumer products. A great deal has been written about home interactive terminals which would operate in conjunction with television systems and computers to permit a consumer to participate in various services. These include library services, management and business functions, stock market quotations, banking, etc.

To date many of the described systems contemplate the use of a television frame storage device. Such a device would be capable of storing a television frame or picture for later playback on a television monitor or a receiver employing a kinescope.

The ability to store a television frame for later playback has many advantages in conjunction with the present television format. For example, a consumer product which would include a television receiver operating in conjunction with a frame storage device would enable the consumer to store and recall "stop action" frames, player line-ups in sporting events, scoreboard information, product information, tallies for quiz shows, recipes, children's games and quizzes, educational information and a great number of other types of pictorial format.

Such apparatus would have to be compatible with present television standards, relatively inexpensive and simple to operate.

It is therefore an object of the present invention to provide apparatus for receiving television transmissions or television pictures and for storing any desired frame of television information for later playback.

In an embodiment of the present invention, a television monitor is utilized. The monitor is of the type capable of responding to television signals, said television signals containing image brightness and synchronizing components. The monitor includes a video amplifier for responding to the image brightness components and a synchronizing circuit responsive to the synchronizing components.

In combination with the monitor is apparatus for storing a selected television image including a storage device of the type having a target comprising a plurality of insulators arranged on a substrate, said device having an input electrode and a control electrode and including means for generating an electron beam for varying the charge on said insulators. The control electrode is operative to modulate said beam according to a desired signal applied thereto to cause said insulators to be charged to a pattern determined by said desired signal.

First control means couple the video amplifier of said television receiver to said control electrode in a first state to modulate said beam according to said image brightness components and for isolating the same in a second state, and logic means coupled to said synchronizing circuit and responsive to the operation of said controllable means in said first position for permitting the application of said image brigthness components to said control electrode for one television frame.

Further embodiments include second controllable means coupled to said control electrode of the storage device and responsive to said first controllable means being in said second state for operating in a first state to apply a fixed reference voltage to said control electrode to cause the velocity of said electron beam to decrease and in a second state for removing said voltage. Means coupled to said target electrode of said storage device are responsive to the operation of said second controllable means in said first state to permit said lower velocity beam to propagate for a duration greater than a television frame to dischage said pattern stored by said insulators.

Other modes of operation include additional circuitry for responding to the pattern stored on said insulator to enable selective reading of said pattern via the video amplifier of said television monitor to thereby produce a television display determinative of the stored charge pattern.

The present invention will be described in detail if reference is made to the following specification when read in conjunction with the accompanying figures, in which.

Figure 5:
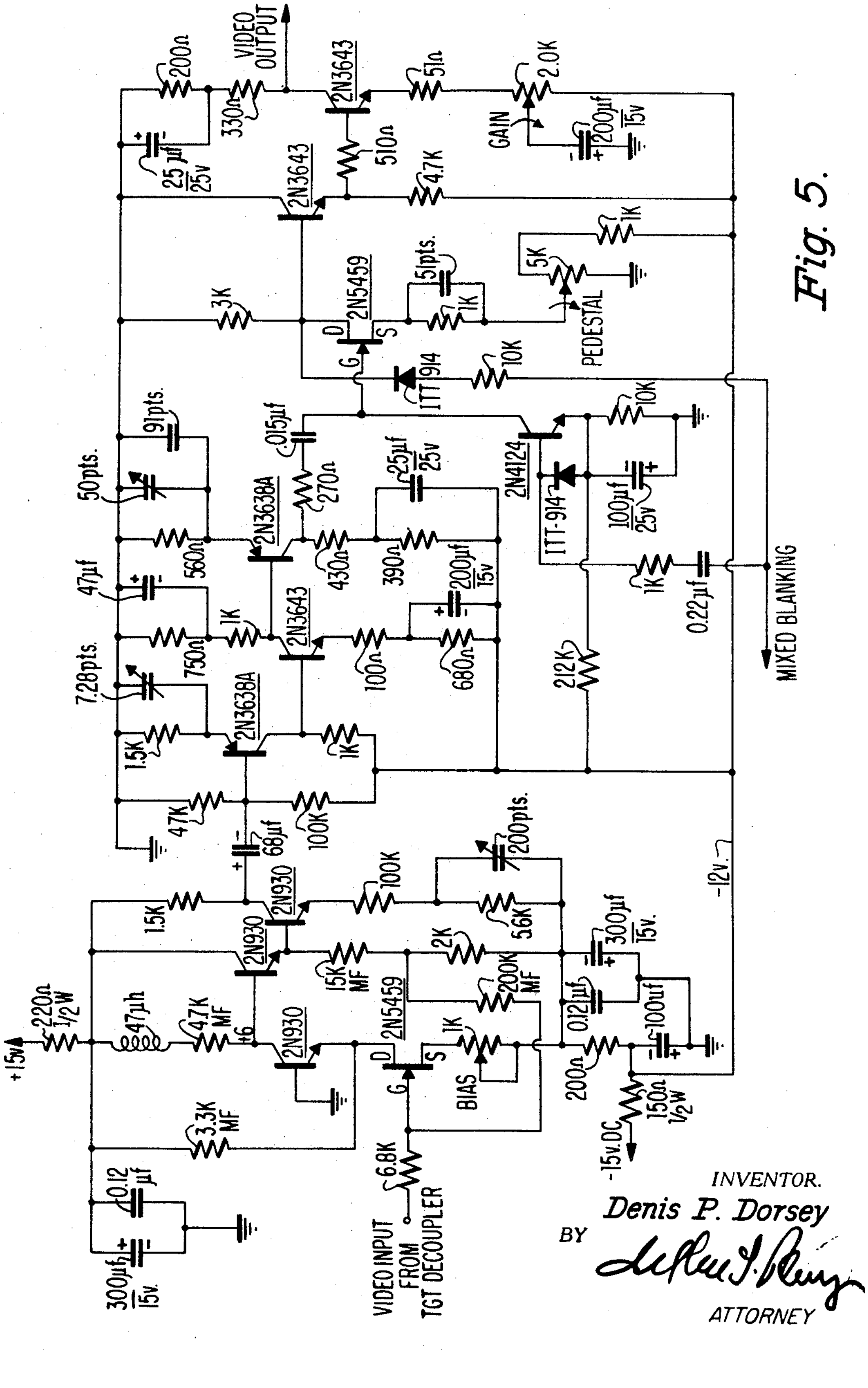

FIGS. **4*a* and 4*b*** are schematic diagrams showing the logic control circuitry according to this invention;

FIG. 5 is a schematic diagram showing a READ amplifier according to this invention.

Figure 1:
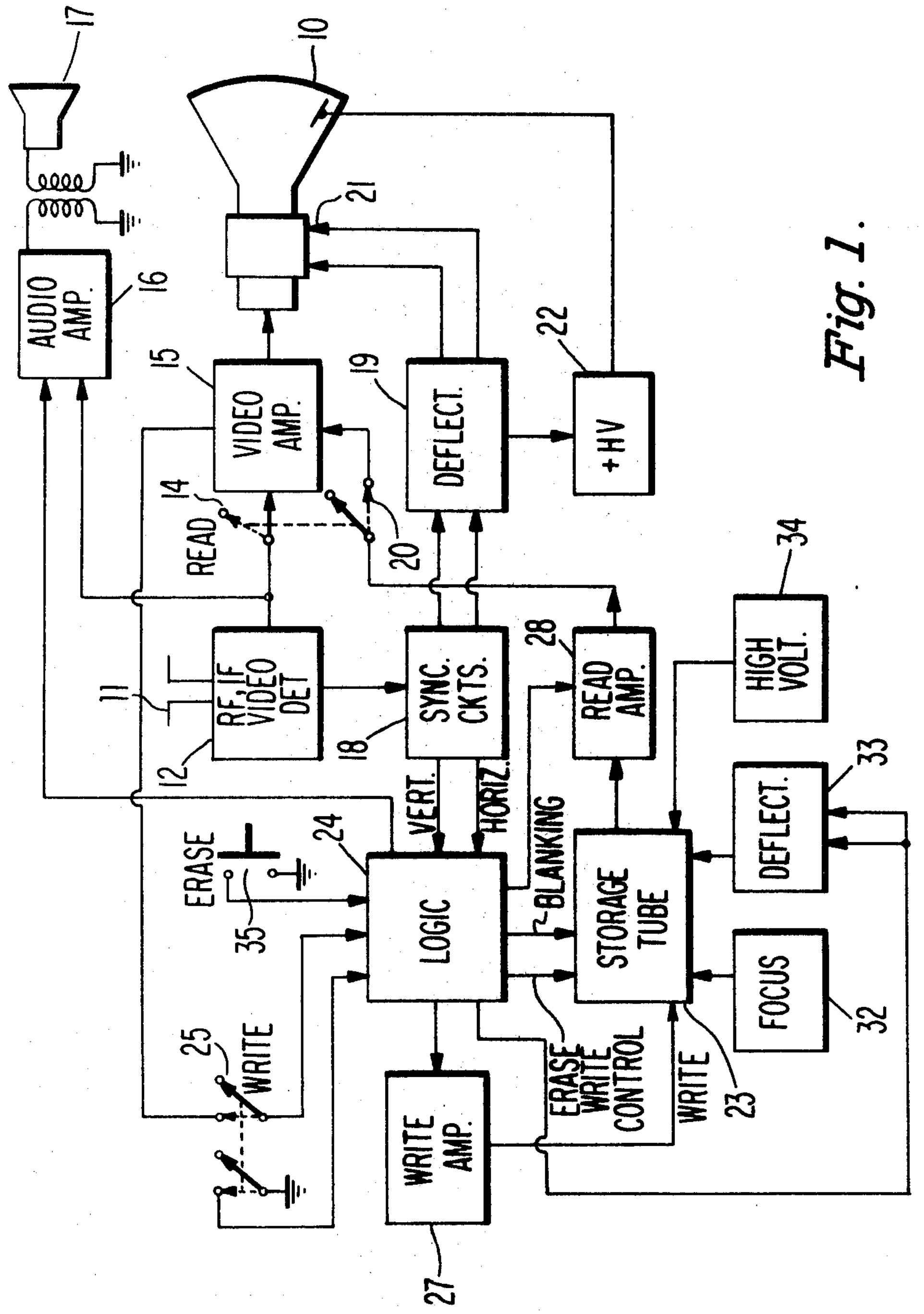
FIG. 1 is a block diagram of a television storage system according to this invention.

Referring to FIG. 1, there is shown a television storage system. The television system includes a conventional kinescope 10 as employed in a television receiver. The receiver includes an antenna 11 which is responsive to radio frequency transmissions in the television band for applying the same to the input of a schematic module 12. The module 12 conventionally contains the radio frequency, intermediate frequency, and video detector circuits.

These circuits serve to demodulate the received carrier signal to produce a detected video signal at the output of the module 12. The video signal is applied via a READ switch 14 to the input of a video amplifier 15. The output of the video amplifier 15 is conventionally applied to a suitable input electrode, such as the cathode, of the kinescope 10.

The output of the video detector contained in module 12 is also applied to conventional audio circuits 16 for driving a speaker 17 to produce the second portion of the television program.

There is also shown an input from module 12 which serves to drive a sync separator circuit 18. The output of the sync circuit 18 is conventionally applied to deflection circuits 19 which provide suitable driving waveshapes of generating a stable raster on the face of the kinescope 10. These vertical and horizontal deflection signals are conventionally applied to the kinescope by means of a yoke 21.

The deflection circuitry is also coupled to a high voltage module 22 which is used in generating the high voltage potentials necessary to bias the kinescope 10.

Thus far, the above description has specified a conventional television receiver as is well known in the art. It is to this receiver that a storage system is added to provide a television system capable of storing, for later playback, any desired video frame.

A major component utilized in the storage system includes a storage tube 23 which, as will be explained, is a silicon-vidicon tube. The storage tube 23 is controlled in operation by means of a logic module 24.

The logic module 24 includes various logic circuitry useful for generating control functions for the storage tube 23. The logic module 24 has inputs coupled to the sync circuits 18 for receiving vertical and horizontal sync pulses. These pulses are utilized to control the storage tube in its various modes, such as the ERASE, WRITE and READ modes.

Blanking of the storage tube 23 is also afforded via the logic module 24. An input to the logic module 24 is also obtained via the video amplifier 15 and this input is coupled via a WRITE switch 25. This input is applied to the logic module for processing and is then supplied to the WRITE amplifier 27 for subsequent application to the storage tube 23.

A READ amplifier 28 has an input coupled to the storage tube 23 and an output coupled to the video amplifier 15 via another contact 20 associated with the READ switch 14. The storage tube 23 also has associated therewith a focus circuit 32, a deflection circuit 33 and a high voltage circuit 34. These circuits, as will be explained, may be derived from circuitry normally included in the above-described television receiver.

In order to fully understand the subsequent description, a brief indication of the operating conditions of the storage system will be described.

In such a consumer product it is desired to afford system storage with the addition of a minimum number of controls. The controls shown in FIG. 1, besides the conventional controls normally associated with a television reveiver, include an ERASE switch 35, the READ switch 14 and the WRITE switch 25.

Pressing the ERASE switch 35 serves to erase any charge pattern previously stored on the insulator surface of the target of the storage tube 23, as will be explained. Erasing the target's insulator is fully automatic, and once the ERASE switch 35 is depressed, the storage electronics or logic circuitry 24 controls this operation. Signals in the form of audible clicks indicate the beginning and end of the ERASE cycle and are inserted into the receiver's audio amplifier 16 via the logic module 24. These audible signals inform the operator that the target of the storage tube was erased and is ready to accept the WRITE command.

Once the target is erased, a WRITE cycle could commence. Closing the WRITE switch 25 enables the WRITE amplifier 27 to modulate the writing beam of the storage tube 23 with the video signal. The WRITE time duration is for one complete video frame. This cycle charges the insulators on the target of the storage tube to enable storage of the video information contained in this frame. The writing cycle occurs as soon as the writing switch 25 is closed, because of the prior erasure of the target. The ERASE and WRITE cycles as internally controlled by the logic circuitry 24 do not affect the normal operation of the television receiver.

After the WRITE cycle, the operator may recall the stored video frame by depressing the READ switch. Depressing the READ switch interrupts the main video program and electronically transfers the stored image to the kinescope 10 via the video amplifier 15. Basically, this is accomplished by cancelling the normal video drive signal to the video amplifier 15 and replacing it with the video signal from the READ amplifier 28. As long as the READ switch is activated, the stored image appears on the face of the kinescope 10. When the READ switch is released, the main video program reappears on the kinescope 10 and the recalling or playback of the stored information could occur at any time subsequent by simply activating the READ switch.

Figure 2:
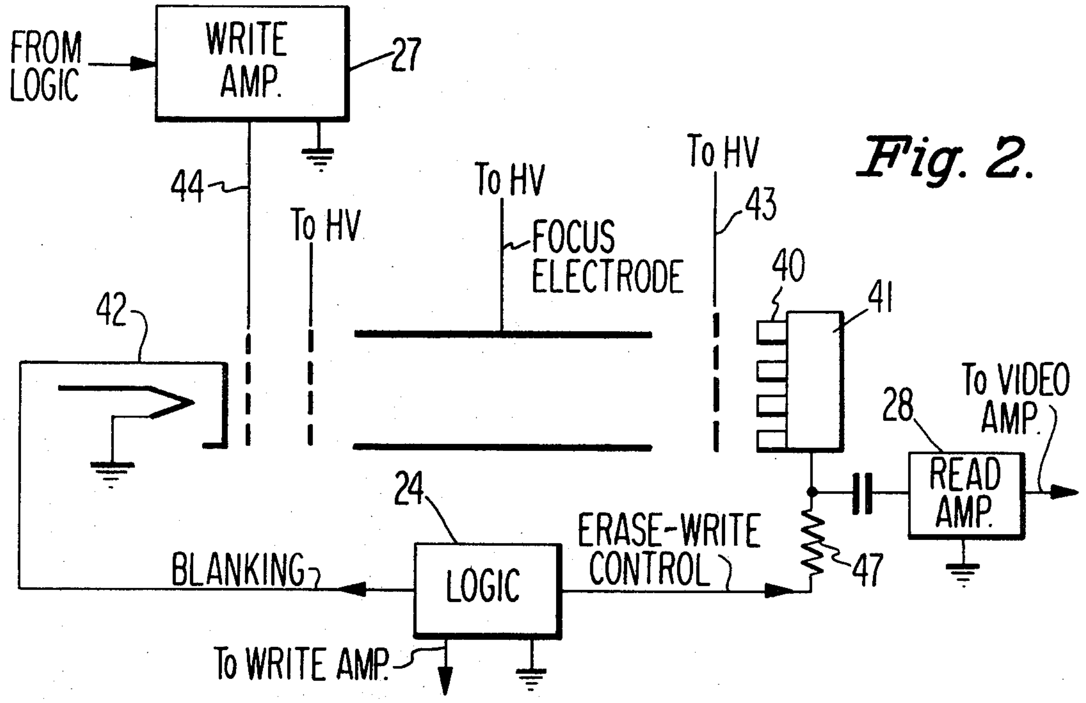
FIG. 2 is a schematic diagram partially in block form of a storage tube configuration utilized in conjunction with this invention.

Referring to FIG. 2, there is shown a schematic layout of the internal electrode structure of the silicon storage tube 23 of FIG. 1. The target of the storage tube 23 consists of a coplanar array of silicon dioxide insulators 40 on a relatively square P-type silicon wafer 41. The silicon wafer 41, for example, might be approximately a 1 centimeter square configuration. Using standard photolithographic techniques it is possible to etch approximately 600,000 of these insulating elements 40 on the substrate wafer 41. Each element 40 can be selectively charged by controlling the electron beam directed to the substrate 41.

Once a particular charge pattern is established on the insulator elements, the charge is essentially nondestructive and it can be utilized to modulate another fixed biased electron beam which is directed to the substrate. To afford this mode of operation, it is therefore necessary to prepare the target surface, charge the insulator by controlling the beam and then switch the substrate to a potential that will permit the charge to remain.

These operations are under control of the logic module 24. An output of the logic module is coupled to the substrate 41 via resistor 47.

When the target is being scanned by a suitable electron beam in the READ mode, the silicion dioxide insulators 40 are negative with respect to the cathode 42 of the storage tube. The charge distribution on the insulating surface is a function of the stored image and the bias on the substrate 40.

As the target is being scanned, the total number of electrons reaching the substrate 41 is inversely proportional to the negative charge on the insulator. For example, in a typical storage tube utilized with a READ potential of +8 volts, an insulator potential of −4 volts will prevent any electrons from reaching the substrate. Those electrons repelled by the insulator surface are attracted to the separate mesh grid 43. Those electrons that reach the target's substrate form the signal current of the storage tube. A voltage is then developed across resistor 47 and is amplified by the READ amplifier 28 for application to the video amplifier of the television receiver to therefore display the stored image.

Since the insulator is negative with respect to the cathode 42, none of the electrons directed at the substrate 41 land on the insulator. Therefore, during the READ mode, the insulator surface does not discharge and hence the charge pattern thus formed is essentially nondestructive. However, the vacuum in such a tube is not perfect and gas molecules inside the tube, particularly those between the grid 43 and the target, are ionized by electron collisions. These collisions create positive ions that are attracted to the insulating surface and they will slowly discharge the stored image during the READ mode. Due to the particular construction of the storage tube such as the insulator thickness, the biasing, the target uniformity, the vacuum, and the type of video information stored, the target can be continuously scanned for as long as 30 minutes without a noticeable loss of the stored information.

Before describing in detail the actual ERASE, WRITE and READ modes of operation, it is again noted that:

1 Erasing the target's insulator requires a medium velocity electron beam. This is accomplished by biasing the substrate at +20 volts DC and the grid electrode at cathode potential.

2 Writing is accomplished in one television frame with a high velocity electron beam. This is accomplished by biasing the substrate at +200 volts and modulating the signal at the grid electrode of the storage tube.

3. Reading the stored image was accomplished with a low velocity beam. This is accomplished by placing the target's substrate at +10 volts DC and the grid is biased to approximately −35 volts DC.

To accomplish these control functions, two transistors 66 and 67 are used to drive the target electrode of the storage tube. Transistors 68 and 69 are used to control the grid electrode of the storage tube. Transistor 66 is arranged in a common emitter configuration having a collector resistor 70 returned to a relatively high source of operating potential designated as +200 volts. The collector electrode is coupled via diode 71 to the target electrode of the storage tube.

Transistor 67 is also arranged in a common emitter configuration and has its collector electrode coupled to the collector electrode of transistor 70 via resistor 72 and resistor 73. Resistor 73, as shown, is a potentiometer.

For the ERASE cycle, the target's substrate, as indicated, is biased to +20 volts. This is accomplished by turning transistor 66 off and transistor 67 on. This forms a voltage divider from the +200 volts supply which includes resistors 70, 73 and 72 and the low saturation impedance of transistor 67.

With the above resistors properly chosen, the voltage at the anode of diode 71 is approximately +20 volts. The potentiometer 73 forming part of this voltage divider is used as an adjustment for the ERASE potential to enable one to provide an optimum setting.

In the WRITE mode the target substrate is increased to +200 volts DC which, as indicated, is sufficient to create secondary emission. For this mode of operation both transistors 66 and 67 are cut off. This then causes the voltage at the anode of diode 71 to approach the +200 volts supply.

During the READ mode transistor 66 is operated in a saturated condition. This serves to place reference potential at the collector of transistor 66, thus reverse biasing code 71 and effectively isolating the transistor's drive stages from the storage tube.

As the potential levels at the target's substrate are varied for the ERASE, WRITE and READ modes, the grid of the storage tube is also varied accordingly.

During the ERASE condition transistor 68 is saturated, thus grounding the grid of the storage tube as indicated above. This creates a maximum beam current during the ERASE cycle. To write or store an image on the substrate, the grid has to modulate the electron beam with the video signal. During this mode transistor 68 was cut off. A WRITE amplifier designated by transistor 80 receives its collector operating potential via resistor 81 coupled between the collector of transistor 80 and the collector of transistor 68. The base electrode of transistor 80 is coupled to the video amplifier via some video pre-amplifier stage to thereby allow the transistor amplifier 80 to modulate the writing beam of the storage tube, according to the video signal level.

For the READ interval, transistor stage 68 is biased off and transistor stage 69 having its collector electrode coupled to the collector of transistor 68 via resistors 83 and 84 is biased on. This operation serves to divide the −200 volt supply to place the grid electrode of the storage tube at −35 volts for the READ interval. The potentiometer 83 in the collector circuit of transistor 69 permits a fine adjustment of the reading beam.

The above description indicates the desired potential levels to accommodate the READ, WRITE and ERASE modes and the respective states of transistors 66 to 69 necessary to accomplish these modes. The transistors are controlled by the various logic circuitry which operates as follows.

THE ERASE MODE

When the ERASE switch 35 is operated, it causes a negative transition to appear at the input to gate 82. The output of gate 82 is coupled to the input of gate 83. The output of gate 83 is coupled back to the input of gate 82 and to the input of a gate 84. Gate 84 has its output coupled to the input of gate 85. The output of gate 85 is then coupled to another input of gate 83. The junction between the output of gate 84 and the input of gate 85 is bypassed to ground via a large capacitor 86. The gate circuitry described above operates as a one-shot multivibrator to produce an approximately one-half second pulse at the output of gate 82 and an opposite polarity pulse of the same duration at the output of gate 83.

The operation is as follows. For the negative input pulse via the ERASE switch 35, gate 82 provides a positive output pulse. This positive pulse is inverted by gate 83 to produce a negative pulse at the input to gate 82, thus maintaining the output at the positive level. At the same time the negative output of gate 83 is coupled to the input of gate 84, whose output begins to go positive at a rate determined by capacitor 86. When capacitor 86 charges to a sufficient level, gate 85 produces a negative pulse at its output, causing the output of gate 83 to go positive which thereby blocks gate 82 and terminates the cycle.

Therefore, each time the ERASE switch is closed, erase pulses are produced at the outputs of gates 82 and 83. These pulses are of the same duration but opposite polarity. The output of gate 82 provides a positive pulse which causes transistor 67 to saturate or be turned on during the ERASE mode. The output of gate 83 produces a negative pulse which is applied to gate 66 via the double inverter circuits including gates 89 and 90. This negative pulse serves to cause transistor 66 to be turned off, thus establishing those transistors at the proper operating conditions. The pulse is also applied to the audio amplifier of the television receiver and produces an audible click to inform the operator that erasing is taking place. The leading edge of the pulse provides a first click indicating start of the ERASE cycle and the trailing edge a second click indicating the end of the ERASE cycle.

THE WRITE MODE

When the WRITE switch is closed, a ground is placed at the junction of resistor 101 and capacitor 102. This causes a negative pulse to appear at the input of gate 103, thereby causing the output of gate 103 to go posi- It is noted that the READ time and the storage time are not the same. The storage time is that length of time the storage tube will retain a stored image when it is not being continuously scanned. Since the dielectric relationship time of silicon dioxide is on the order of $5 \times 10^6$ seconds, if the beam is biased off, images can be stored on the insulating surface for weeks.

During the ERASE mode, the insulator's voltage is increased so that each incremental dielectric area is positive with respect to the cathode. This is accomplished by raising the target's substrate from the READ level of +8 volts to the ERASE level of about +20 volts via the logic circuitry 24. The target is then scanned with the grid electrode 44 at ground potential. The scanning is repeated until the insulator surface is discharged to approximately the cathode potential.

In one television frame the highest insulator voltage will be discharged to approximately one half of its initial value. Other areas of the insulator will also discharge but to proportionally lower values. As long as a differential voltage exists between adjacent insulator areas, the target is not considered prepared or erased.

If the target is repeatedly scanned in the ERASE mode, the insulator will continue to discharge to an equilibrium potential whereby all of the storage elements are at the same voltage. Generally, the length of time for the insulator to reach equilibrium is five television frames. Erasing of the target only occurs where the beam lands with proper electrode biasing. If only portions of the target are to be erased, this can be accomplished by simply controlling the deflection size and centering of the electron beam.

After the insulator has been erased, the target is ready to store a charge pattern. This process is designated as the WRITING process and is accomplished by secondary emission. During the WRITE operation electrons strike the silicon dioxide insulators at a high energy level so that a ratio of secondary electrons to primary electrons is greater than one. This means that the net flow of electrons is away from the insulator causing it to charge positively. To achieve the high impact energy to cause secondary emission, the target's substrate is increased from the ERASE potential of +20 volts to the WRITE potential of about +200 volts. This causes the insulator's potential to increase to approximately 180 volts. This voltage is well above the value required to create secondary emission.

There are two important reasons for using an excessive writing potential. First, a high insulator voltage will insure a secondary emission saturation, thereby preventing nonuniformities across the insulator. Secondly, a high insulator voltage during the WRITE mode will result in a maximum secondary emission factor allowing a minimum writing current.

If a full television frame is to be stored on the target, the target must be switched to +200 volts for the frame interval. As the target switches to WRITE, the grid 44 switches from the ERASE potential to a writing potential and modulates the beam with the one frame video signal. While grid 44 modulates the beam, it effectively controls the charge deposited on the insulator; the greater the instantaneous cut-off bias is on grid 44, the less the charge placed on the insulator. Writing occurs only where the modulated beqm strikes the target. Therefore, for selective writing, the beam can easily be controlled magnetically.

Figure 3:
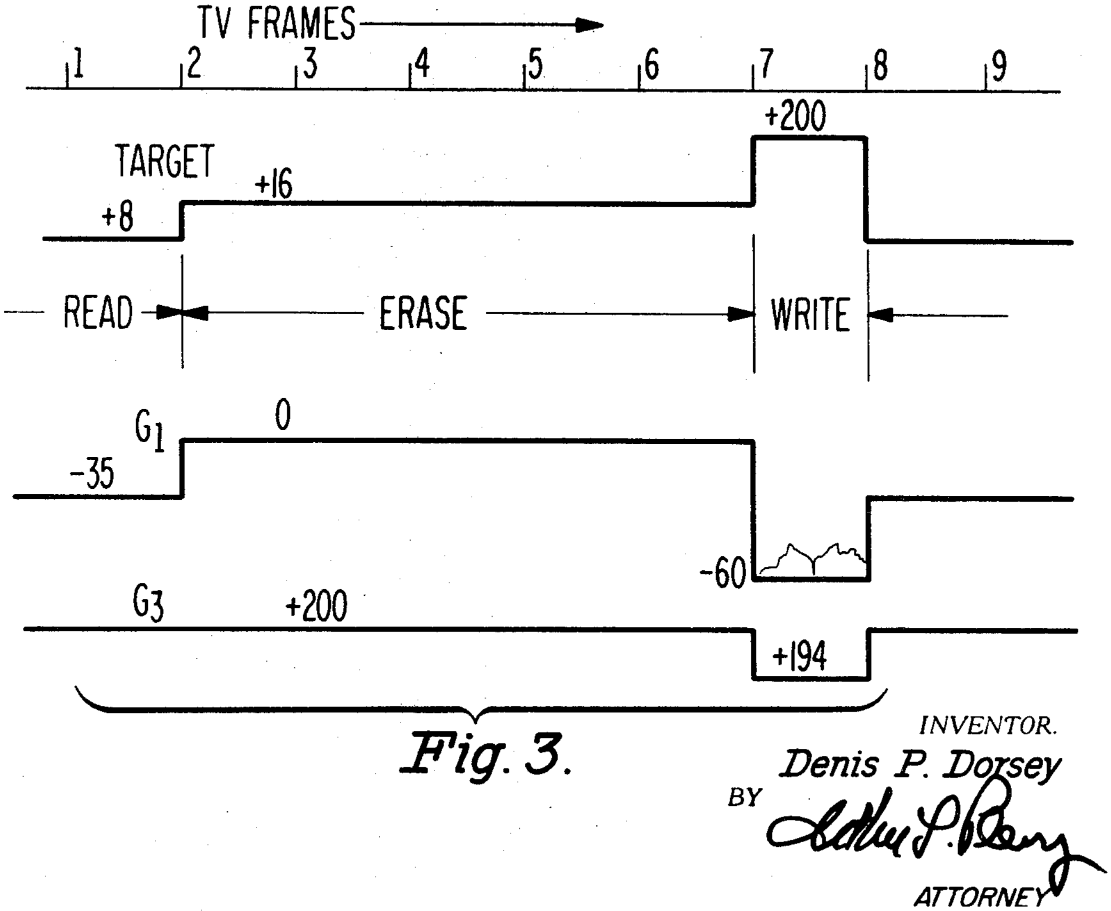
FIG. 3 shows a series of waveforms which are associated with the storage tube shown in FIG. 2.

Referring to FIG. 3, there is shown the electrode timing diagram for the READ, ERASE and WRITE modes. During the READ mode the target is placed at +8 volts. The electrons from the beam do not land on the insulator, but the charge on the insulator modulates the electron beam directed to the substrate.

During the ERASE mode the target is more positive, and the insulator is discharged towards the cathode During the WRITE mode the insulator is charged positive by secondary emission and the incremental insulator charge is proportional to the video signal.

Referring to FIGS. **4*a* and 4*b*, there is shown a detailed schematic diagram of the logic control circuits. Horizontal and vertical synchronizing signals from the sync circuits 18 of FIG. 1 are applied to the logic circuitry. The vertical signal is applied to the cathode of a diode 50, whose anode is coupled to the base electrode of a transistor 41 through a low pass filter arrangement. The collector of transistor 51 is coupled to a source of potential $+V_{cc}$. Biasing is obtained for the base electrode of transistor 51 via resistor 52** coupled between the $+V_{cc}$ source and the base electrode.

The negative-going vertical signal at the cathode of the diode 50 is used to generate the storage system's frame timing, the vertical drive pulse, and the vertical blanking for the storage tube. Transistor 51 is normally biased in a saturated condition. The negative-going vertical pulse drives transistor 51 to cut off. The duration of the vertical pulse appearing at the collector of transistor 51 is determined by the input coupling capacitor 53 and the base biasing resistors as shown.

A relatively small capacitor 54 is coupled between one terminal of capacitor 53 and ground and functions to prevent yoke coupled horizontal signals from appearing at the base of transistor 51.

Transistors 55 and 56 are connected as a monostable multivibrator and operate to provide the blanking pulses for the storage tube. This monostable multivibrator is triggered by the negative-going vertical synchronizing pulse due to the coupling of resistor 57 to the anode of diode 50.

An output pulse of fixed duration appears at the collector electrode of transistor 56 and is then supplied to an inverting gate 58. The output of gate 58 is coupled to the base electrode of a transistor 59 arranged in a common emitter configuration and having its collector coupled to the cathode electrode 42 of the siliconvidicon storage tube. The pulse is in a direction to cause the cathode to go positive with respect to the grid, thus assuring that the storage tube is cut off during this vertical blanking pulse duration.

Horizontal synchronizing pulses are applied directly to the base of transistor 60 arranged in a common emitter configuration. The collector of transistor 60 is coupled to an inverting gate 61. The output of inverting gate 61 is also coupled to the base electrode of transistor 59 where it is effectively summed with the vertical blanking pulse. In this manner transistor 59 drives the storage tubes's cathode to cut off the storage tube electron beam during both horizontal and vertical retrace.

A transistor 65 arranged in a common emitter configuration is utilized to provide the synchronizing signals for the deflection circuits associated with the storage tube 23 of FIG. 1. These deflection amplifiers are typical amplifiers as known in the prior art and are not considered part of this invention.

tive. This, in turn, causes the output of gate 104 to go negative, which causes gate 103 to remain in the positive output state. The positive output of gate 103 is also applied to an input of gate 105. The other input of gate 105 is supplied from the collector electrode of transistor 51.

Gate 105 thereby enabled develops vertical pulses at its output. These pulses are applied to the counting input of a flip-flop 106. At the vertical count of three pulses, the FLIPflop 106 changes its state and serves to reset gate 104, which thereby disables gate 105 and gate 103.

It can be seen from the above description that the WRITE pulse is synchronous with the vertically derived pulses and is exactly one frame long. Therefore, during the WRITE cycle video information contained in one television frame will be stored. It is also seen that during the WRITE cycle both transistors 66 and 67 are biased off and hence the voltage at the anode of diode 71 is at +200 volts.

THE READ MODE

During the READ interval the entire logic module is essentially decoupled from the storage tube except for the biasing on the first grid. During this cycle transistor 66 is saturated, which serves to reverse bias the diode 71. Transistor 68 is biased off and transistor 69 is saturated to serve to provide the necessary beam current during the READ mode and the bias of −35 volts. This condition is always established when the system is not programmed to erase or write. At this point it is also important to remember that the storage tube is only biased on when one of the consumer switches was closed. At any other time the storage tube is biased off, which thereby establishes an extremely long storage time for any image stored on the target's insulator.

With the proper biasing on the grid electrode of the storage tube, the only way to turn on the storage tube's beam is to ground the cathode. To ground the cathode transistor 59 has to be saturated by applying a positive pulse to its base electrode. This can be accomplished by biasing gate 107 off during the desired times.

1. During the ERASE pulse gate 107 is biased off via gate 108, which has its input coupled to the output of gate 82. Hence, the cathode of the storage tube is grounded during the duration of the ERASE pulse.
2. During the WRITE pulse gate 109 serves to bias gate 107 off and thus serves to ground the cathode.
3. During the READ cycle the READ switch, which is coupled to the outputs of gates 108 and 109, serves to bias transistor 59 on, via gate 107, and thus serves to ground the cathode.

Hence, it is seen that the only time the storage tube beam is on is during one of the three modes. During the normal video cycle the storage tube is off, and hence, as indicated, large storage times are obtained.

Figure 4A:
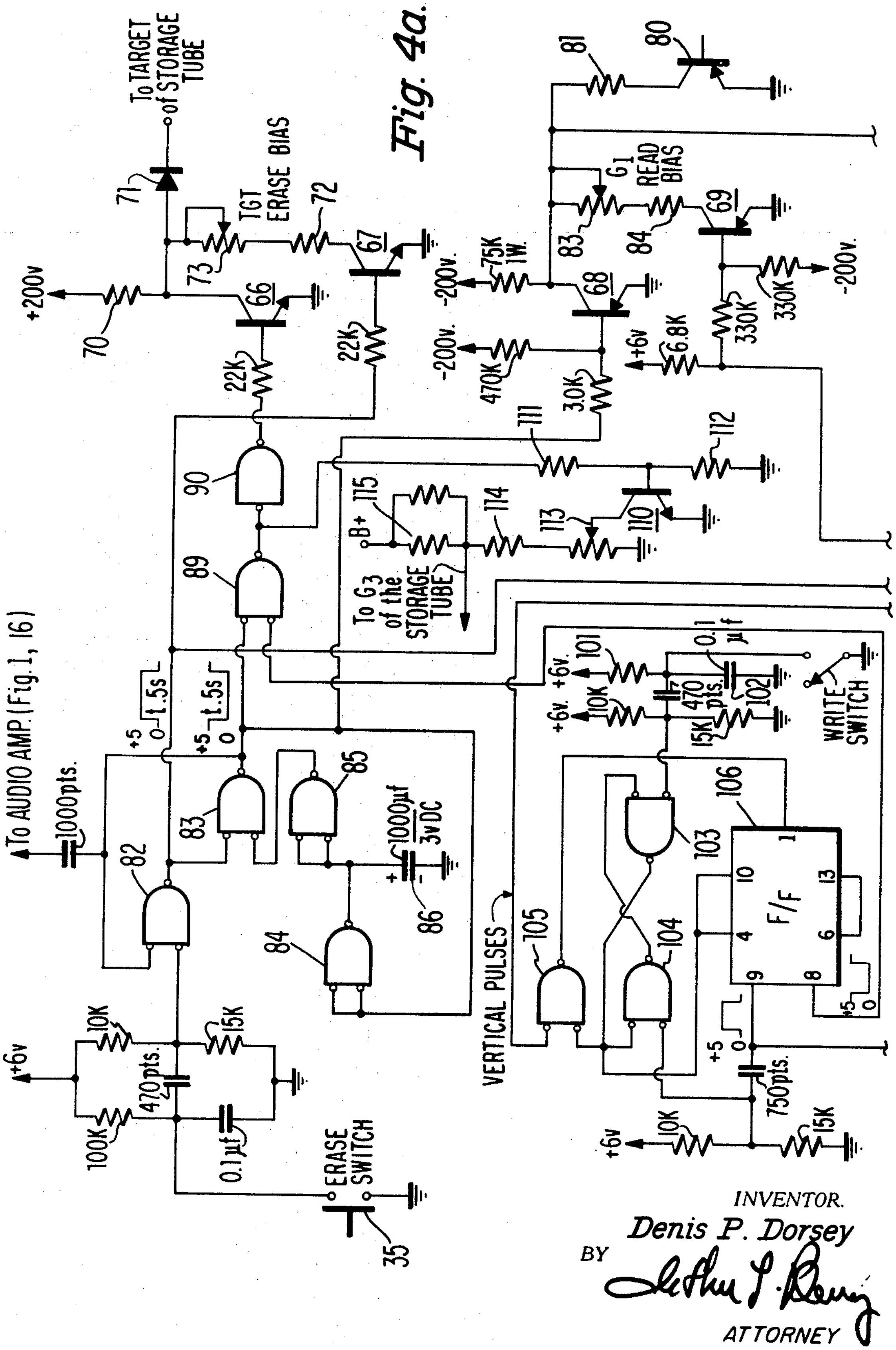
Figure 4B:
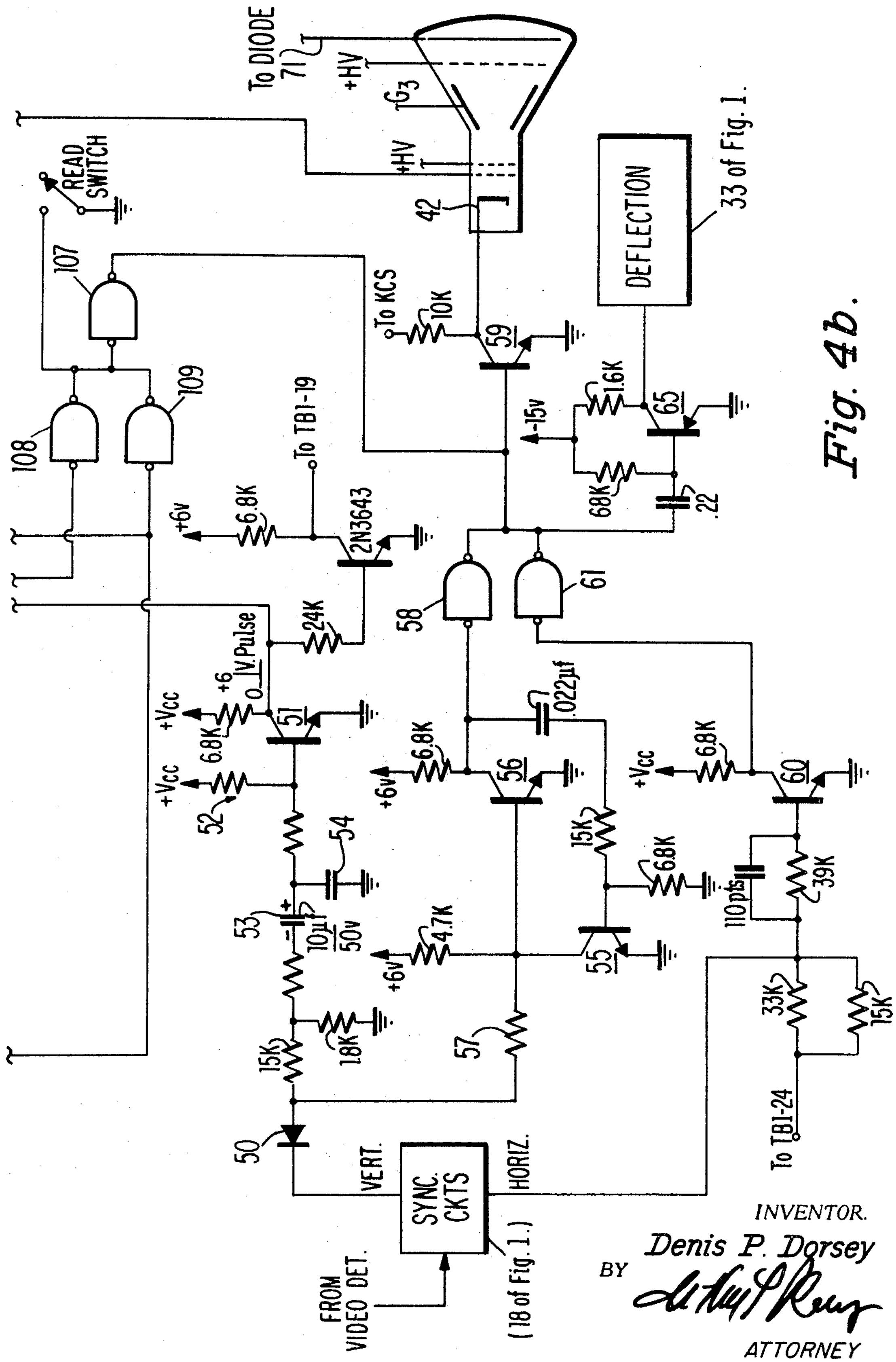

Another control that is shown in FIG. 4 is a focusing circuit, which is necessary during the WRITE interval. A transistor 110 is arranged in a common emitter configuration and receives base biasing from the output of gate 89 via the divider consisting of resistors 111 and 112.

The collector electrode of transistor 110 is coupled through a potentiometer 113 to a source of operating potential B+ via a resistor configuration. The junction between the collector resistors 114 and 115 is coupled to the third grid of the storage tube which is a focusing grid. Transistor 110 conducts during the WRITE mode because of the positive pulse applied to its base. This conduction serves to reduce the voltage on the focus electrode during the WRITE condition. This is necessary to compensate for the varying characteristics of the storage tube.

It is also noted that an ERASE pulse is also applied to transistor 110, and this serves to slightly defocus the electron beam during the ERASE mode by increasing the electron beam size. The increased size of the electron beam permits a more effective erasing cycle.

As indicated above, during the writing cycle the first grid of the storage tube has to be modulated in order to modulate the storage tube's electron beam. This is accomplished with a conventional amplifier having a gamma correction network. Gamma correction is only utilized to a minimum extent since most of the present storage tubes have a substantially linear gamma.

The READ amplifier, which is connected to the target electrode of the storage tube as shown in FIG. 2 is essentially a wide band video pre-amplifier. The target current in such a storage tube has a maximum value of about 0.5 microamps. Such storage tubes will operate satisfactorily with peak signal currents of 0.2 microamps.

The WRITE amplifier should preferably have a high input impedance so as not to load down the target load resistor. Such an amplifier can be accommodated by utilizing a field effect transistor as an input stage. Frequency, shaping and compensation is also included in such an amplifier in order to provide optimum performance.

An example of a READ amplifier utilized is shown in detail in FIG. 5.

What is claimed is:

1. In a monitor having a display device for reproducing received television information signals containing image brightness and synchronizing components, said monitor also including a video amplifier for responding to said image brightness components, and a synchronizing circuit responsive to said synchronizing components for providing line and field scanning rate deflection signals for said display device, the combination therewith of:

a. a storage device of the type having a target comprising a plurality of insulators arranged on a substrate, said storage device having an input electrode, a target electrode and a control electrode and including means for generating an electron beam for varying the charge on said insulators, said control electrode operative to modulate said beam according to a desired signal applied thereto to cause said insulators to be charged to a pattern determined by said desired signal, b. first controllable means coupling said video amplifier of said television monitor to said control electrode of said storage device in a first state to modulate said beam according to said image brightness components, and for isolating the same in a second state, and c. logic means responsive to the operation of said controllable means in said first state and coupled to said monitor synchronizing circuit for permitting the application of said image brightness components to said control electrode to modulate and deflect said electron beam for a time and in a manner governed by the duration of said line and field scanning rate signals so as to store a single television frame of a selected television image.

2. The combination according to claim 1 further comprising:

a. second controllable means coupled to said control electrode of said storage device responsive to said first controllable means being in said second state, for operating in a first state for applying a first voltage to the substrate of said storage device and a second, fixed reference voltage to said control electrode, to cause the velocity of said electron beam to decrease, and in a second state for removing said first and second voltages, and b. means coupled to said target electrode of said storage device and responsive to the operation of said second controllable means in said first state to permit said lower velocity beam to propagate for a duration greater than said single television frame to discharge said pattern stored by said insulators and erase said selected television information from said storage device.

3. In a television receiver of the type employing radio and intermediate frequency amplifiers for responding to transmitted television signals, said television signals containing image brightness and synchronizing components, said receiver including a video amplifier for responding to said image brightness components, and a synchronizing circuit responsive to said synchronizing components, in combination therewith apparatus for storing a selected image comprising:

a. a storage device of the type having a target comprising a plurality of insulators arranged on a substrate, said device having an input electrode, a target electrode and a control electrode and including means for generating an electron beam for varying the charge on said insulators, said control electrode operative to modulate said beam according to a desired signal applied thereto to cause said insulators to be charged to a pattern determined by said desired signal, b. first controllable means coupling said video amplifier of said television receiver to said control electrode of said storage device in a first state to modulate said beam according to said image brightness components, and for isolating the same in a second state, c. logic means coupled to said synchronizing circuit and responsive to the operation of said controllable means in said first position for permitting the application of said image brightness components to said control electrode for one television frame, d. second controllable means coupled to said control electrode of said storage device responsive to said first controllable means being in said second state, for operating in a first state for applying a fixed reference voltage to said control electrode to cause the velocity of said electron beam to decrease, and in a second state for removing said voltage, e. means coupled to said target electrode of said storage device and responsive to the operation of said second controllable means in said first state to permit said lower velocity beam to propagate for a duration greater than a television frame to discharge said pattern stored by said insulators;

wherein said television receiver further includes an audio amplifier responsive to audio components contained in a television signal, and means coupled to said audio amplifier and responsive to said operation of said second controllable means for applying a signal to said audio amplifier sufficient to provide an indication that said stored pattern is being discharged.

4. The combination according to claim 2 further comprising:

a. third controllable means coupled to said control electrode of said storage device responsive to said first and second controllable means operated in said second states, for operating in a first state for applying a third voltage to the substrate of said storage device of like polarity but lesser value than said first voltage and a fourth voltage to said control electrode of polarity opposite to said first and third voltages, to further decrease the velocity of said electron beam, and in a second state for removing said second and fourth voltages, b. means coupled to said taget electrode of said storage tube and responsive to the operation of said third controllable means in said first state for deriving a signal proportional to the current flow from said target electrode due to said decreased velocity beam, said signal being representative of the reading of said single frame of stored television information, and c. means for decoupling said image brightness components from said video amplifier and for coupling said stored image representative signal to said amplifier, instead, to be reproduced by said display device.

* * * * *